(12) United States Patent
Chan et al.

(10) Patent No.: US 7,239,476 B2
(45) Date of Patent: Jul. 3, 2007

(54) SYSTEM, METHOD, AND APPARATUS FOR DISTRIBUTING STRESS WITH ONE OR MORE CAVITIES IN A DISK CLAMP FOR DISK DRIVE APPLICATIONS

(75) Inventors: Andre Sirilutporn Chan, Milpitas, CA (US); Jr-Yi Shen, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 415 days.

(21) Appl. No.: 10/843,725

(22) Filed: May 12, 2004

(65) Prior Publication Data

US 2005/0254166 A1   Nov. 17, 2005

(51) Int. Cl.
*G11B 17/08* (2006.01)
(52) U.S. Cl. ................................... 360/98.08
(58) Field of Classification Search ............ None
See application file for complete search history.

(56) References Cited

U.S. PATENT DOCUMENTS

| | | | |
|---|---|---|---|
| 5,333,080 A | 7/1994 | Ridinger | |
| 5,490,024 A | 2/1996 | Briggs | |
| 5,517,376 A | 5/1996 | Green | |
| 5,550,687 A | 8/1996 | Suzuki | |
| 5,822,151 A | 10/1998 | Albrecht | |
| 6,028,739 A | 2/2000 | Lindrose | |
| 6,563,668 B1* | 5/2003 | Suwito | 360/98.08 |
| 6,594,109 B2 | 7/2003 | Renken | |
| 6,724,567 B1* | 4/2004 | Kazmierczak et al. | 360/98.08 |
| 6,816,338 B1* | 11/2004 | Suwito | 360/99.12 |
| 2003/0209529 A1* | 11/2003 | Church et al. | 219/121.85 |

FOREIGN PATENT DOCUMENTS

| | | |
|---|---|---|
| JP | 61189451 | 11/1986 |
| JP | 3121540 | 12/1991 |
| JP | 4038754 | 2/1992 |
| JP | 4195781 | 7/1992 |
| JP | 5020760 | 1/1993 |
| JP | 5047129 | 2/1993 |
| JP | 2000100123 | 4/2000 |
| JP | 2001331995 | 11/2001 |

OTHER PUBLICATIONS

"Disk Clamp with Spot Facing under Screw Surface", IBM Technical Disclosure Bulletin, vol. 40, No. 09, Sep. 1997, pp. 137-140.
Research Disclosure, May 1990, 31383 Molded Push/Push Knob Design.

* cited by examiner

*Primary Examiner*—Allen Cao
(74) *Attorney, Agent, or Firm*—Bracewell & Giuliani LLP

(57) ABSTRACT

A disk clamp for securing data storage disks to the hub of a spindle motor in a hard disk drive has a stress distributing cavity to reduce the stress concentration on disk under the screw locations. The cavity may comprise a single, completely circumferential annular slot located in the perimeter side wall of the clamp, or a series of smaller cavities that are angularly aligned with each screw in the perimeter of the clamp. In the case of adding a series of small stress distribution cavities, the load distribution is modulated to higher harmonic components, thus reducing the peak-to-valley value of reaction force on the contact ring by about 20% to 50%.

22 Claims, 6 Drawing Sheets

SYSTEM, METHOD, AND APPARATUS FOR DISTRIBUTING STRESS WITH ONE OR MORE CAVITIES IN A DISK CLAMP FOR DISK DRIVE APPLICATIONS

BACKGROUND OF THE INVENTION

1. Technical Field

The present invention relates in general to an improved disk drive and, in particular, to an improved system, method, and apparatus for distributing stress in a disk clamp by providing one or more perimeter cavities in the disk clamp.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk.

When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

The attachment of the data storage disks to the hub of the spindle motor is accomplished via a disk clamp. The disk clamp retains the disks on the hub by attaching directly to the hub of the motor. A conventional disk clamp 11 (FIGS. 1 and 2) is typically secured to a spindle motor 13 with several screws 15. The clamp engages an adjacent disk 17 to axial restrain the disk and other disks 17 below it, as shown, via spacer rings 19. However, the screws 15 create stress concentrations 21 (plotted schematically in FIG. 3), which cause waviness in disk circumferential curvature when the disk clamp 11 contacts the disk 17.

One prior art solution is to this problem is to put an additional spacer ring 19 between the clamp 11 and the disk 17. Unfortunately, with limited axial space in the disk drive, this solution is not always feasible. Thus, an improved system, method, and apparatus for attaching a disk clamp on the hub of a spindle motor in a disk drive that avoids stress concentrations in the disks would be desirable.

SUMMARY OF THE INVENTION

One embodiment of a disk clamp for securing data storage disks to the hub of a spindle motor in a hard disk drive has a stress distributing cavity (e.g., a slot, hole, cut out, etc.) in the clamp structure to reduce the stress concentration under the screw location(s). The cavity can be used to reduce the screw pattern while the external dimension of the disk clamp remains the same to fit in all existing designs. The cavity may comprise a single, completely circumferential annular slot located in the perimeter side wall of the clamp, or a series of smaller cavities (e.g., one per screw) that are angularly aligned with each screw in the perimeter of the clamp.

By adding the stress distribution cavity, the load distribution is modulated to higher harmonic components, thus reducing the peak-to-valley value of reaction force on the contact ring. The annular slot embodiment reduces amplitude by about 50%, while the multi-cavity embodiment reduces amplitude by about 20%.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 4:
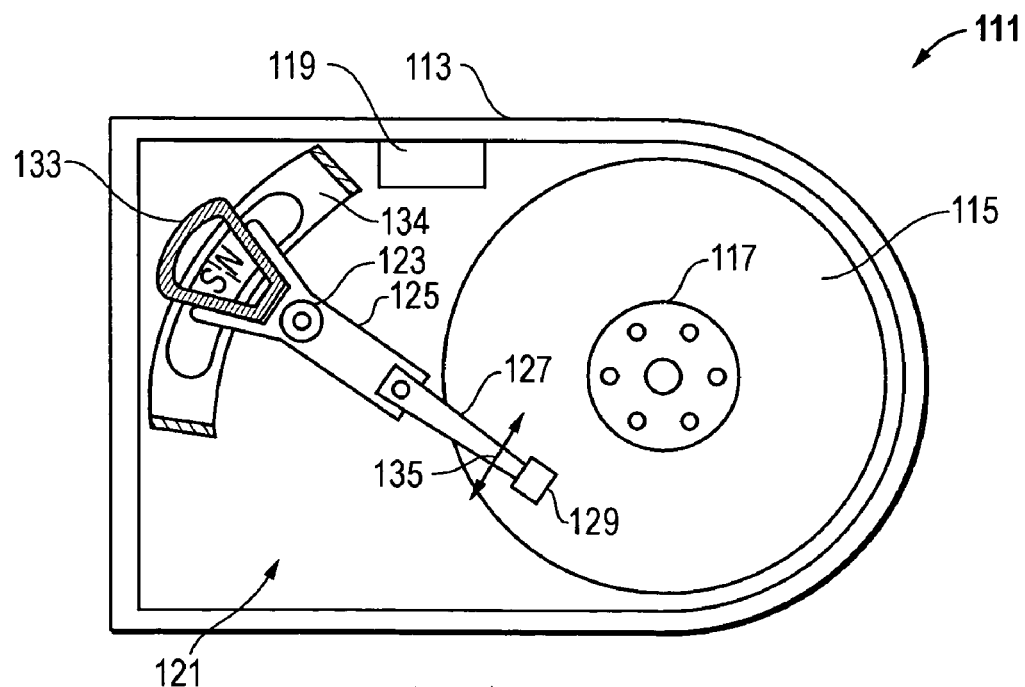
FIG. 4 is a simplified plan view of one embodiment of a disk drive constructed in accordance with the present invention.

Referring to FIG. 4, a schematic drawing of one embodiment of an information storage system comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly having a central drive hub assembly 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disks 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disks 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be nano size (approximately 850×700×230 microns) and is pre-loaded against the surface of disk 115 (in the range two to ten grams) by suspension 127.

Suspensions 127 have a spring-like quality which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disks 115 until the heads settle on their respective target tracks. The head gimbal assemblies operate in a conventional manner and always move in unison with one another, unless drive 111 uses multiple independent actuators (not shown) wherein the arms can move independently of one another.

Figure 5:
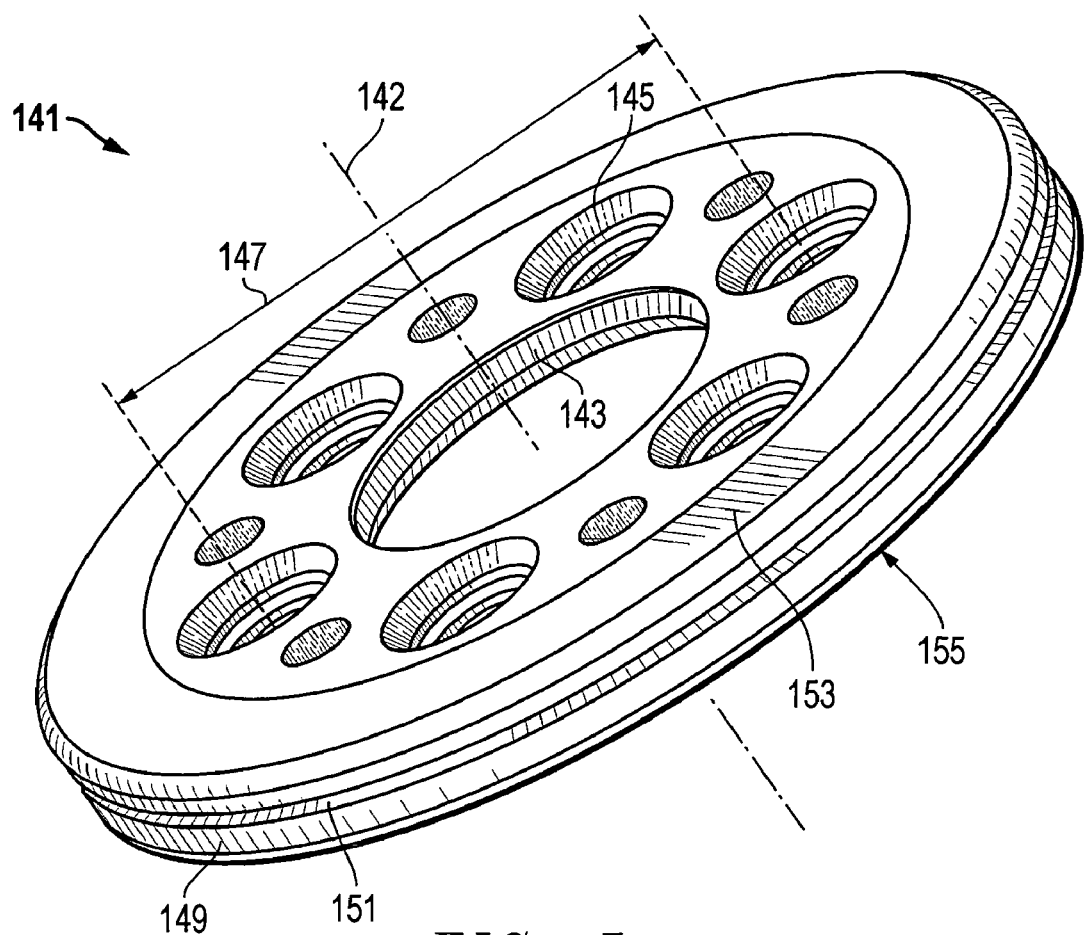
FIG. 5 is an isometric view of one embodiment of a disk clamp utilized by the disk drive of FIG. 4 and is constructed in accordance with the present invention.
Figure 6:
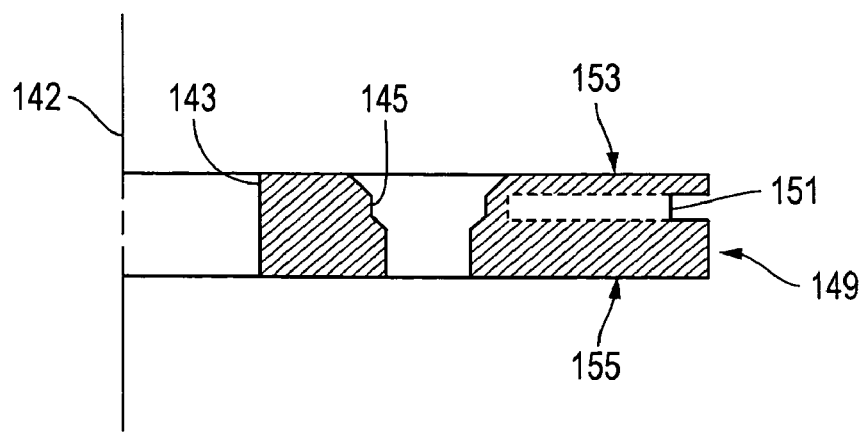
FIG. 6 is a sectional side view of the disk clamp of FIG. 5.

Referring now to FIGS. 5 and 6, one embodiment of a solution for attaching a disk clamp 141 on the hub 117 of the spindle motor in the disk drive 111 that avoids stress concentrations in the media disk 115 is shown. The clamp 141 is a generally flat, circular, disk. Clamp has a central axis 142, a central hub aperture 143, a plurality of symmetrically spaced-apart fastener openings 145 formed on a bolt circle diameter 147 about the axis 142, and an annular perimeter wall 149 that circumscribes the clamp 141.

Figure 10:
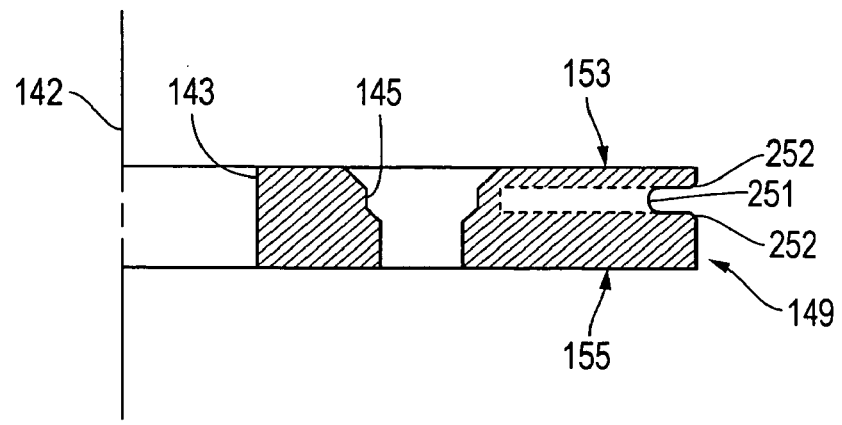
FIG. 10 is an isometric view of an alternate embodiment of the disk clamp of FIG. 7 and is constructed in accordance with the present invention.

An annular recess or cavity 151 is formed in and circumscribes the perimeter wall 149. The cavity 151 has a generally square or rectangular cross-section (FIG. 6) and is relatively shallow, as shown. However, as shown in FIG. 10, the sharp edges in the rectangular shape may be finished with, e.g., fillets 252, chamfers, etc., and/or the overall geometric cross-sectional shape of cavity 251 may vary (e.g., rounded, circular, oval, etc.).

The cavity 151 protrudes from an interior of the clamp 141 all the way to the open exterior of the clamp 141 on the perimeter wall 149. Although the cavity 151 is radially outboard of the fastener openings 145, the inner radius of the cavity 151 may be deepened (see dashed lines in FIG. 6) such that it radially approaches and somewhat overlaps a radial outermost portion of the fastener openings 145. In the embodiment shown, the cavity 151 is located axially closer to one surface 153 of the clamp 141 (e.g., the axially outermost surface) than an opposite surface 155. Thus, the cavity 151 does not necessarily bisect the perimeter wall 149. The cavity 151 has an axial dimension that is approximately one-third to one-half of the axial dimension of the perimeter wall 149.

Figure 7:
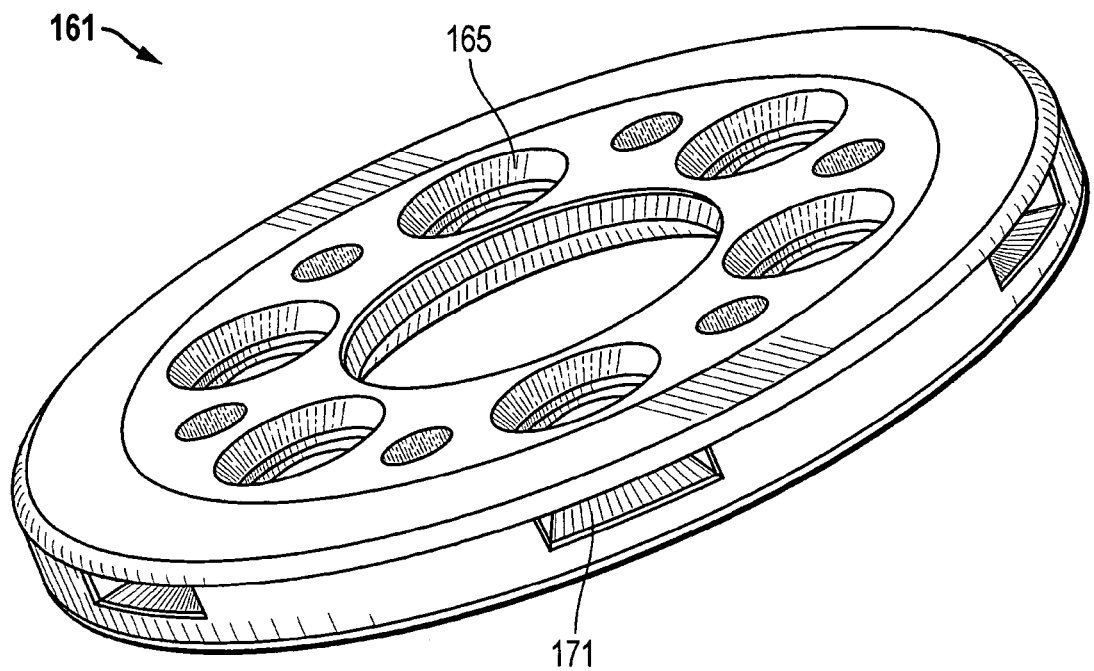
FIG. 7 is an isometric view of an alternate embodiment of a disk clamp utilized by the disk drive of FIG. 4 and is constructed in accordance with the present invention.
Figure 11:
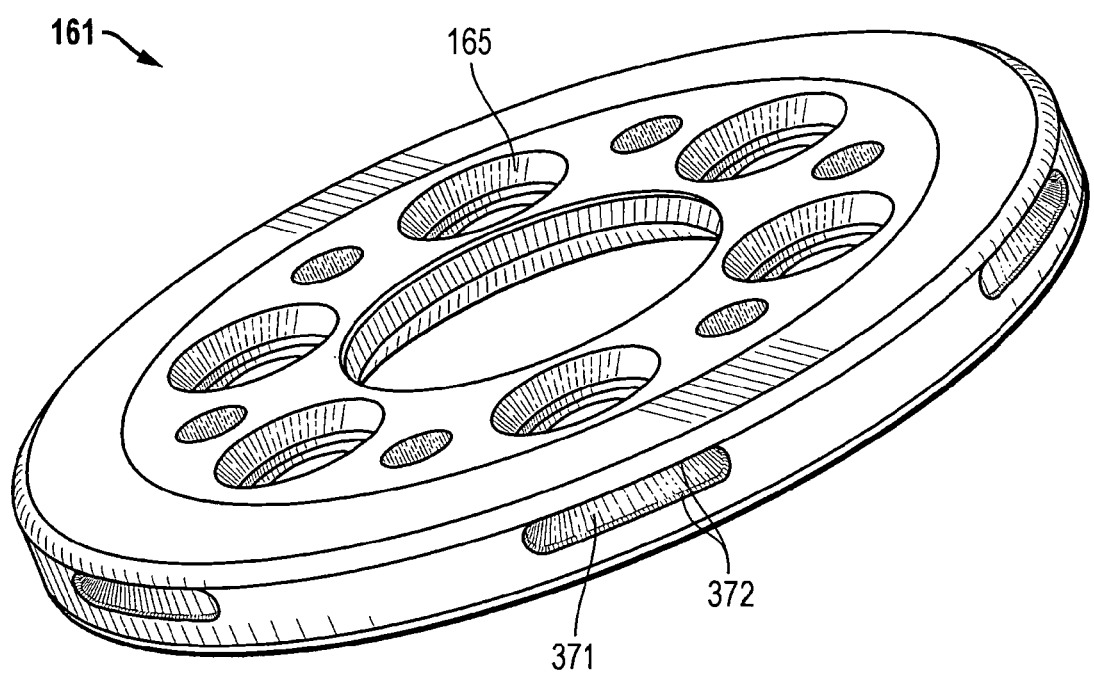
FIG. 11 is an isometric view of another alternate embodiment of the disk clamp of FIG. 7 and is constructed in accordance with the present invention.

An alternate embodiment of the present invention is shown in FIG. 7. In this version, the disk clamp 161 is very similar to the disk clamp 141 (FIGS. 5 and 6), except that the cavity 171 comprises a plurality of cavities 171. The cavities 171 are equal in number to the number of fastener openings 165, and are angularly aligned with each other as well. Each cavity 171 has a width or angular displacement that is approximately equal to a diameter of its respective fastener opening 165. However, the angular displacement may vary (i.e., wider or narrower than shown) according to the application. The shape, radial depth, axial thickness, and axial position of cavities 171 are consistent with and may vary as described above for cavity 151. Moreover, the size of each opening may be optimally determined based on the design that suits a particular need of load distribution on the media disk. For example, as shown in FIG. 11, the sharp edges in the rectangular shape may be finished 372 with, e.g., fillets, chamfers, etc., and/or the overall geometric cross-sectional shape of each cavity 371 may vary (e.g., rounded, circular, oval, etc.).

Figure 1:
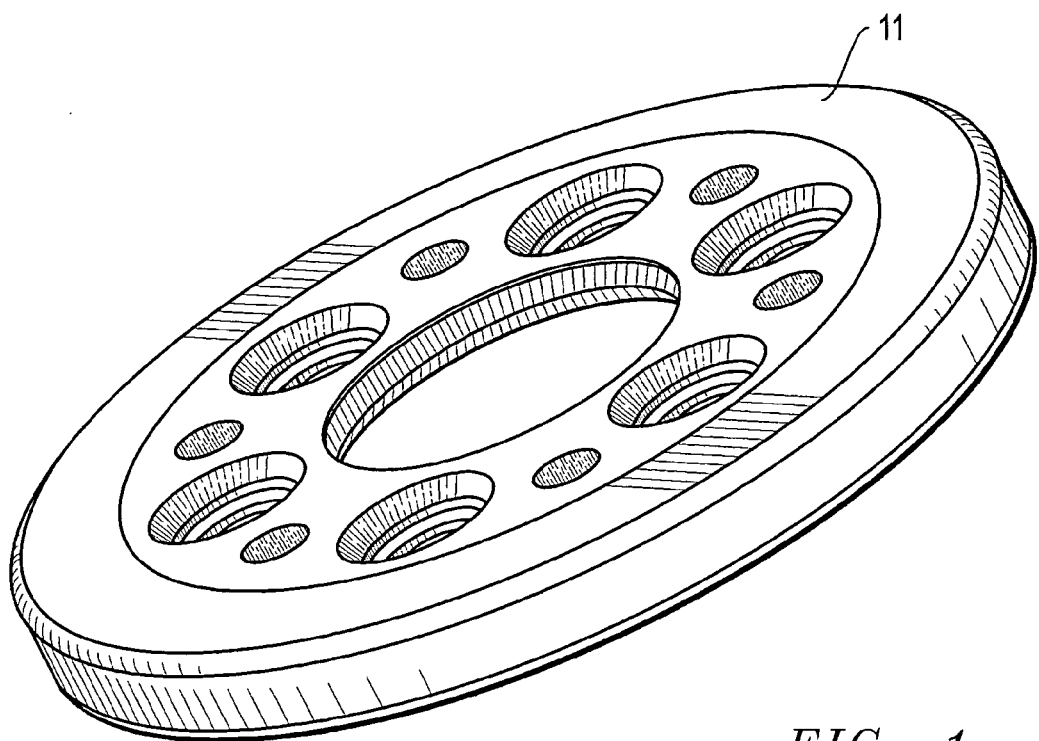
FIG. 1 is an isometric view of a conventional disk clamp.
Figure 2:
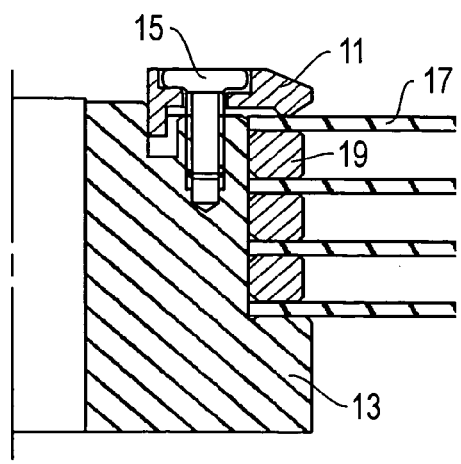
FIG. 2 is a sectional side view of the conventional disk clamp of FIG. 1 installed in a disk drive.
Figure 3:
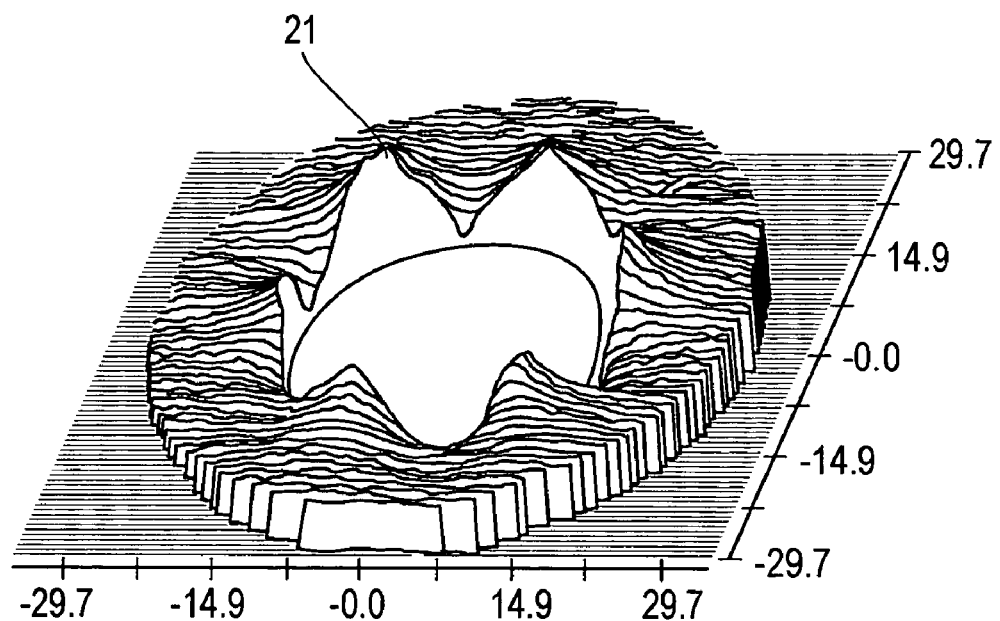
FIG. 3 is a three-dimensional plot of stress concentrations in the conventional disk clamp and disk drive assembly of FIG. 2.
Figure 8:
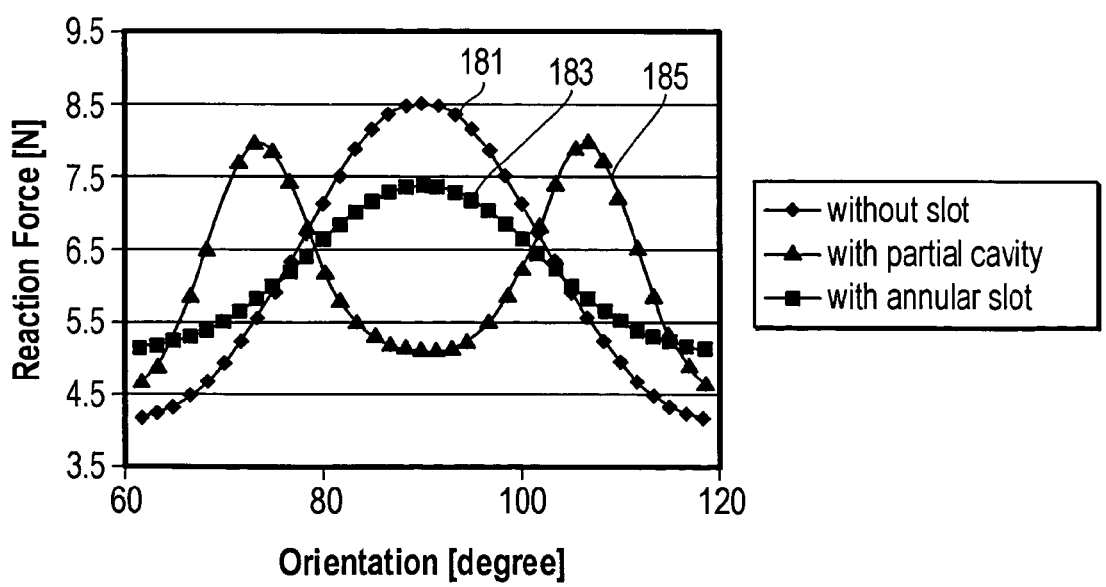
FIG. 8 is a plot of reaction force distribution in the disk clamps of FIGS. 5 and 7 when separately installed in the disk drive of FIG. 4.
Figure 9:
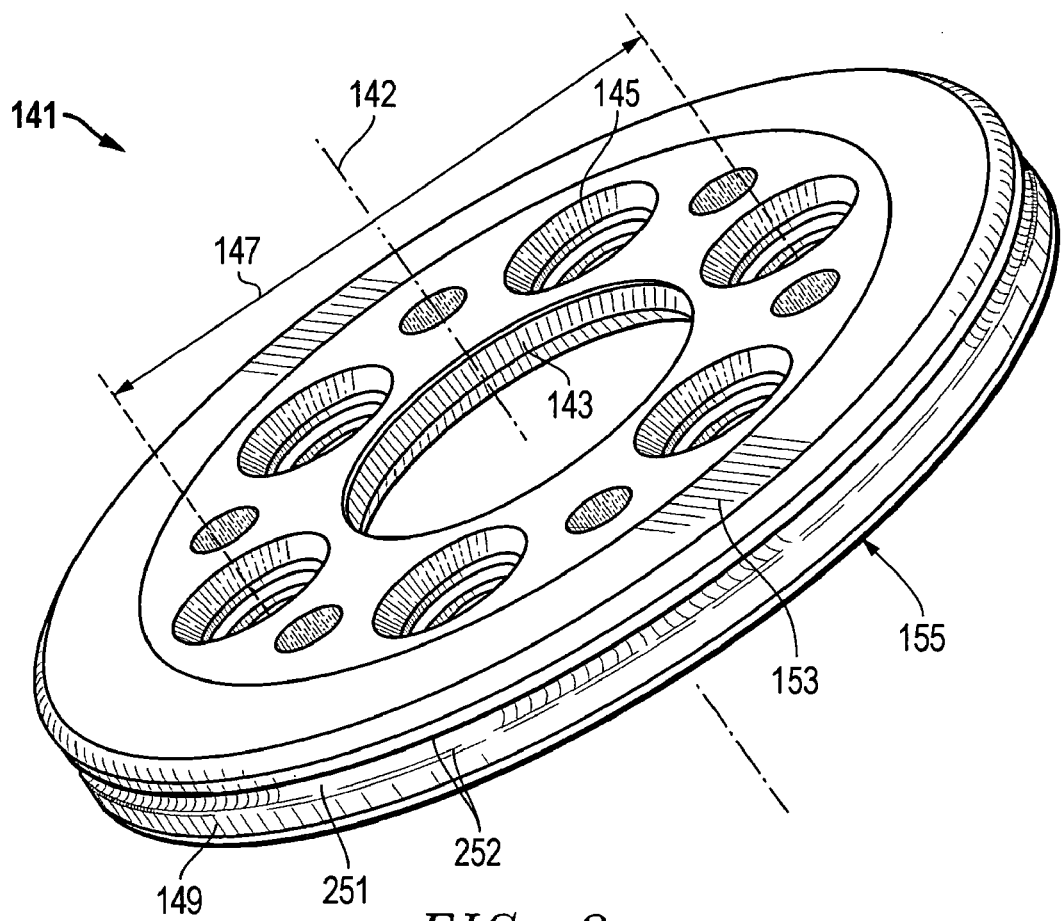
FIG. 9 is an isometric view of an alternate embodiment of the disk clamp of FIG. 5 and is constructed in accordance with the present invention.

Referring now to FIG. 8, plots of the reaction force distribution between various clamps and media disks are shown. Plot 181 illustrates the reaction force distribution between the prior art clamp 11 and disk 17 (see FIGS. 1–3). The maximum reaction force for plot 181 is about 8.5 N. Plot 183 illustrates the reaction force distribution between clamp 141 constructed in accordance with the first embodiment of the present invention and disk 115 (FIGS. 4–6). The maximum reaction force for plot 183 is about 7.4 N. Finally, plot 185 illustrates the reaction force distribution between clamp 161 constructed in accordance with the second embodiment of the present invention and disk 115 (FIGS. 4 and 7). The maximum reaction force for plot 185 is about 8.0 N. The improved designs of the present invention reduce the peak-to-valley value of reaction force by 20% to 50% over the prior art.

The present invention has several advantages, including the ability to reduce distortion in media disks. The single, integrated disk clamp structure of the present invention can alleviate the need to use a spacer ring between the disk clamp and the axially outboard disk located adjacent to the disk clamp. Moreover, the present designs are readily incorporated into existing disk clamps without the need for modification of the hubs or disks associated with them.

While the invention has been shown or described in only some of its forms, it should be apparent to those skilled in the art that it is not so limited, but is susceptible to various changes without departing from the scope of the invention.

What is claimed is:

1. A disk drive, comprising:
   an enclosure having a spindle motor, a media disk mounted to the spindle motor, an actuator having a read/write head for reading data from and writing data to the media disk;
   a disk clamp for securing the media disk to the spindle motor, the disk clamp having a central axis, a fastener opening, an annular perimeter wall that circumscribes the disk clamp, and a cavity formed in the perimeter wall for reducing stress between the disk clamp and the media disk when a fastener secures the disk clamp to the spindle motor; and
   the cavity has an inner radius that radially approaches and overlaps a radial outermost portion of the fastener opening.

2. The disk drive of claim 1, wherein the fastener opening comprises a plurality of fastener openings and the cavity comprises a plurality of cavities that are equal in number to a number of the fastener openings, and respective ones of the cavities are angularly aligned with the fastener openings.

3. The disk drive of claim 2, wherein each cavity has an angular displacement that is approximately equal to a diameter of the fastener openings.

4. The disk drive of claim 1, wherein the cavity has a generally rectangular cross-section.

5. The disk drive of claim 1, wherein the cavity protrudes from an interior of the disk clamp all the way to an open exterior of the disk clamp on the perimeter wall.

6. The disk drive of claim 1, wherein the cavity is radially outboard of the fastener opening.

7. The disk drive of claim 1, wherein the cavity has an axial dimension that is approximately one-third to one-half of an axial dimension of the perimeter wall.

8. A disk clamp, comprising:
   a disk clamp body having a generally flat, circular shape, the disk clamp body further having a central axis, a central hub aperture, a plurality of symmetrically spaced-apart fastener openings formed on a bolt circle diameter about the axis, and an annular perimeter wall that circumscribes the disk clamp body, the annular perimeter wall being substantially perpendicular to a pair of opposed surfaces on the disk clamp body;
   an annular cavity formed in and circumscribing the perimeter wall, the annular cavity being adapted to reduce stress between the disk clamp and an adjacent media disk in a disk drive; and
   the annular cavity has an axial dimension that is approximately one-third to one-half of an axial dimension of the perimeter wall.

9. The disk clamp of claim 8, wherein the annular cavity has a generally rectangular cross-section.

10. The disk clamp of claim 8, wherein the annular cavity protrudes from an interior of the disk clamp body all the way to an open exterior of the disk clamp body on the perimeter wall.

11. The disk clamp of claim 8, wherein the annular cavity is radially outboard of the fastener openings.

12. The disk clamp of claim 8, wherein the annular cavity has an inner radius that radially approaches and overlaps a radial outermost portion of the fastener openings.

13. The disk clamp of claim 8, wherein the annular cavity is located axially closer to one of the opposed surfaces than the other, such that the annular cavity does not bisect the perimeter wall.

14. A disk clamp, comprising:
   a disk clamp body having a generally flat, circular shape, the disk clamp body further having a central axis, a central hub aperture, a plurality of symmetrically spaced-apart fastener openings formed on a bolt circle diameter about the axis, and an annular, outer perimeter wall that circumscribes the disk clamp body, the annular outer perimeter wall being substantially perpendicular to a pair of opposed surfaces on the disk clamp body; and
   a plurality of cavities formed in the annular outer perimeter wall, the cavities being adapted to reduce stress between the disk clamp and an adjacent media disk in a disk drive.

15. The disk clamp of claim 14, wherein the cavities are equal in number to a number of the fastener openings, and respective ones of the cavities are angularly aligned with the fastener openings.

16. The disk clamp of claim 14, wherein each cavity has an angular displacement that is approximately equal to a diameter of the fastener openings.

17. The disk clamp of claim 14, wherein each of the cavities has a generally rectangular cross-section.

18. The disk clamp of claim 14, wherein each of the cavities protrudes from an interior of the disk clamp body all the way to an open exterior of the disk clamp body on the annular outer perimeter wall.

19. The disk clamp of claim 14, wherein each of the cavities is radially outboard of the fastener openings.

20. The disk clamp of claim 14, wherein each of the cavities has an inner radius that radially approaches and overlaps a radial outermost portion of the fastener openings.

21. The disk clamp of claim 14, wherein each of the cavities is located axially closer to one of the opposed surfaces than the other, such that the cavities do not bisect the annular outer perimeter wall.

22. The disk clamp of claim 14, wherein each of the cavities has an axial dimension that is approximately one-third to one-half of an axial dimension of the annular outer perimeter wall.

* * * * *